(12) United States Patent
Bidkar et al.

(10) Patent No.: US 12,340,796 B2
(45) Date of Patent: Jun. 24, 2025

(54) VOICE PROCESSING USING PHOTONIC QUANTUM COMPUTING

(71) Applicant: Bank of America Corporation, Charlotte, NC (US)

(72) Inventors: Prashant Anna Bidkar, Shakarpur (IN); Ankit Upadhyaya, Gurugram (IN); Prashant Khare, Mumbai (IN); Mani Arora, Gurgaon (IN)

(73) Assignee: Bank of America Corporation, Charlotte, NC (US)

( * ) Notice: Subject to any disclaimer, the term of this patent is extended or adjusted under 35 U.S.C. 154(b) by 378 days.

(21) Appl. No.: 18/068,873

(22) Filed: Dec. 20, 2022

(65) Prior Publication Data

US 2024/0203402 A1 Jun. 20, 2024

(51) Int. Cl.
*G10L 15/16* (2006.01)
*G06N 10/60* (2022.01)
*G10L 15/02* (2006.01)
*G10L 15/18* (2013.01)
(Continued)

(52) U.S. Cl.
CPC .............. *G10L 15/16* (2013.01); *G06N 10/60* (2022.01); *G10L 15/02* (2013.01); *G10L 15/1815* (2013.01); *G10L 15/22* (2013.01); *G10L 25/06* (2013.01)

(58) Field of Classification Search
CPC ...... G06F 40/30; G06F 40/211; G06F 40/253; G06F 40/268; G06F 40/284; G10L 15/16; G10L 19/005; G10L 19/00; G10L 25/27; G10L 25/30; G10L 15/12; G10L 15/02; G10L 15/063; G10L 15/07; G10L 15/08; G10L 15/20; G10L 15/22; G10L 15/26; G10L 15/30; G10L 15/1822; G10L 15/183; G10L 15/193; G10L 15/19
See application file for complete search history.

(56) References Cited

U.S. PATENT DOCUMENTS

| 6,995,404 B2 | 2/2006 | Franson et al. |
| 8,190,548 B2 | 5/2012 | Choi |
| 8,560,282 B2 | 10/2013 | Macready et al. |

(Continued)

FOREIGN PATENT DOCUMENTS

| AU | 2017273863 A1 | 1/2019 |
| CN | 111630531 A | 9/2020 |

OTHER PUBLICATIONS

U.S. Appl. No. 18/068,607, filed Dec. 20, 2022.
U.S. Appl. No. 18/069,001, filed Dec. 20, 2022.

*Primary Examiner* — Vu B Hang

(57) ABSTRACT

A system and method for voice processing using photonic quantum computing. A method includes receiving voice data represented by classical binary bits. The voice data is converted to a first photon beam including converted voice data represented by photonic quantum bits. The first photon beam is split into split photon beams. The split photon beams are received by a quantum neural network, which includes quantum neural network clusters. The converted voice data is processed by processing the split photon beams. Each of the split photon beams is processed by a respective neural network cluster in parallel. Processing the converted voice data includes extracting voice features. Word embeddings are created based on the voice features. Sentences are determined based on the word embeddings.

20 Claims, 8 Drawing Sheets

(51) Int. Cl.
*G10L 15/22* (2006.01)
*G10L 25/06* (2013.01)

(56) References Cited

U.S. PATENT DOCUMENTS

| | | |
|---|---|---|
| 8,583,896 B2 | 11/2013 | Cadambi et al. |
| 8,700,552 B2 | 4/2014 | Yu et al. |
| 9,162,881 B2 | 10/2015 | Biamonte et al. |
| 9,354,039 B2 | 5/2016 | Mower et al. |
| 9,495,644 B2 | 11/2016 | Chudak et al. |
| 9,791,258 B2 | 10/2017 | Mower et al. |
| 9,881,256 B2 | 1/2018 | Hamze et al. |
| 10,248,664 B1 | 4/2019 | Shen et al. |
| 10,352,992 B1 | 7/2019 | Zeng et al. |
| 10,417,574 B2 | 9/2019 | Babbush et al. |
| 10,608,663 B2 | 3/2020 | Gould et al. |
| 10,740,693 B2 | 8/2020 | Lazovich et al. |
| 11,017,309 B2 | 5/2021 | Roques-Carmes et al. |
| 11,042,811 B2 | 6/2021 | Rolfe et al. |
| 11,218,227 B2 | 1/2022 | Bunandar et al. |
| 11,222,256 B2 | 1/2022 | Teng et al. |
| 11,238,336 B2 | 2/2022 | Mehrabian et al. |
| 11,257,483 B2 * | 2/2022 | Czarnowski ............ G10L 15/22 |
| 11,258,415 B2 | 2/2022 | Shainline et al. |
| 11,295,207 B2 | 4/2022 | Wiebe et al. |
| 11,334,107 B2 | 5/2022 | Carolan et al. |
| 11,392,830 B2 | 7/2022 | Ozcan et al. |
| 11,461,334 B2 | 10/2022 | Bhattacharjee et al. |
| 2015/0354938 A1 | 12/2015 | Mower et al. |
| 2016/0110657 A1 | 4/2016 | Gibiansky et al. |
| 2016/0155049 A1 | 6/2016 | Choi |
| 2016/0224903 A1 | 8/2016 | Talathi et al. |
| 2016/0328644 A1 | 11/2016 | Lin et al. |
| 2017/0177751 A1 | 6/2017 | Macready et al. |
| 2018/0232652 A1 | 8/2018 | Curtis et al. |
| 2018/0375790 A1 | 12/2018 | Dadashikelayeh et al. |
| 2019/0370644 A1 | 12/2019 | Kenney et al. |
| 2020/0005186 A1 | 1/2020 | Romero et al. |
| 2020/0026942 A1 | 1/2020 | Jiang et al. |
| 2020/0110992 A1 | 4/2020 | Hosseinzadeh et al. |
| 2020/0134461 A1 | 4/2020 | Chai et al. |
| 2020/0320424 A1 | 10/2020 | Yarkoni et al. |
| 2020/0379504 A1 | 12/2020 | Carolan et al. |

* cited by examiner

VOICE PROCESSING USING PHOTONIC QUANTUM COMPUTING

TECHNICAL FIELD

The present disclosure relates generally to voice processing, and more specifically to a system and method for voice processing using photonic quantum computing.

BACKGROUND

Generally, voice processing using classical computing systems may require significant computing resources (e.g., computing time). Accordingly, more efficient voice processing systems and methods are needed.

SUMMARY

The system described in the present disclosure provides several practical applications and technical advantages that overcome the current technical problems as described herein. The following disclosure is particularly integrated into practical applications of: (1) parallel data processing using photonic quantum computing; (2) voice processing using photonic quantum computing; and (3) image processing using photonic quantum computing.

By using a photonic quantum computing system, a computing time may be reduced, which may in turn lead to overall reduction of computing resource utilization. In particular, various tasks may be performed in parallel, which in addition to quantum parallelization of the photonic quantum computing system, may lead to about 1000 times increase in computing speed. Accordingly, embodiments described herein provide improvements to an underlying computing system.

In one embodiment, an apparatus includes a converter system. The converter system is configured to receive a plurality of tasks and convert the plurality of tasks to a first photon beam comprising the plurality of converted tasks. Each of the plurality of tasks corresponds a work type. The plurality of tasks are represented by classical binary bits. The plurality of converted tasks are represented by photonic quantum bits. The apparatus includes a photonic quantum computing system communicatively coupled the converter system. The photonic quantum computing system includes a beam splitter. The beam splitter is configured to receive the first photon beam and split the first photon beam into a plurality of split photon beams. Each split photon beam corresponds to a subset of the plurality of converted tasks that have a same work type. The photonic quantum computing system further includes a photonic quantum processor coupled to the beam splitter and implementing a quantum neural network. The quantum neural network includes a plurality of quantum neural network clusters. The photonic quantum processor is configured to receive the plurality of split photon beams and process the plurality of converted tasks. Each photon beam is received by a respective quantum neural network cluster. Each subset of the plurality of converted tasks is processed by a respective quantum neural network cluster in parallel. Processing the plurality of converted tasks includes identifying one or more duplicate tasks in each subset of the plurality of converted tasks, removing the one or more duplicate tasks, and generate a plurality of outputs based on respective converted tasks. Each output corresponds to a respective task. The plurality of outputs are generated as a second photon beam.

In another embodiment, an apparatus includes a converter system. The converter system is configured to receive voice data and convert the voice data to a first photon beam comprising converted voice data. The voice data is represented by classical binary bits. The converted voice data is represented by photonic quantum bits. The apparatus further includes a photonic quantum computing system communicatively coupled the converter system. The photonic quantum computing system includes a beam splitter. The beam splitter is configured to receive the first photon beam and split the first photon beam into a plurality of split photon beams. The photonic quantum computing system further includes a photonic quantum processor coupled to the beam splitter and implementing a quantum neural network. The quantum neural network comprises a plurality of quantum neural network clusters. The photonic quantum processor is configured to receive the plurality of split photon beams and process the converted voice data by processing the plurality of split photon beams. Each of the plurality of split photon beams is processed by a respective neural network cluster in parallel. Processing the converted voice data includes extracting a plurality of voice features from the converted voice data, creating word embeddings based on the plurality of voice features, determining a plurality of sentences based on the word embeddings, determining first correlations between each word and all other words of each sentence based on the word embeddings, identifying a context of each sentence based on the first correlations, determining second correlations between each word of each sentence and all words of a previous sentence based on the word embeddings, determining an intent of the plurality of sentences based on the first correlations and the second correlations, and sending the plurality of sentences and the intent to the converter system as a second photon beam.

In yet another embodiment, an apparatus includes a converter system. The converter system is configured to receive image data and convert the image data to a photon beam comprising converted image data. The image data includes red-channel image data, green-channel image data, and blue-channel image data. The image data is represented by classical binary bits. The converted image data includes converted red-channel image data, converted green-channel image data, and converted blue-channel image data. The converted image data is represented by photonic quantum bits. The apparatus further includes a photonic quantum computing system communicatively coupled the converter system. The photonic quantum computing system includes a beam splitter. The beam splitter is configured to receive the photon beam and split the photon beam into a red-channel photon beam, a green-channel photon beam, and a blue-channel photon beam. The red-channel photon beam includes the red-channel image data, the green-channel photon beam includes the green-channel image data, and the blue-channel photon beam includes to the blue-channel image data. The photonic quantum computing system further includes a photonic quantum processor coupled to the beam splitter and implementing a quantum neural network. The quantum neural network comprises a plurality of quantum neural network clusters. The photonic quantum processor is configured to receive the red-channel photon beam, the green-channel photon beam, and the blue-channel photon beam and process the converted image data by processing the red-channel photon beam, the green-channel photon beam, and the blue-channel photon beam. Each of the red-channel photon beam, the green-channel photon beam, and the blue-channel photon beam is processed by a respective neural network cluster in parallel. Processing the red-channel photon beam includes converting the converted red-channel image data into a first grayscale image data, applying one or more first filters to the first grayscale image data to extract a plurality of first features, applying a first pooling process to the plurality of first features to eliminate orientation effects, comparing the plurality of first features to a plurality of pre-trained features extracted from pre-training images, in response to the plurality of first features matching respective pre-trained features, identifying a plurality of identified first features and sending the plurality of identified first features to the converter system as a second red-channel photon beam.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1A:
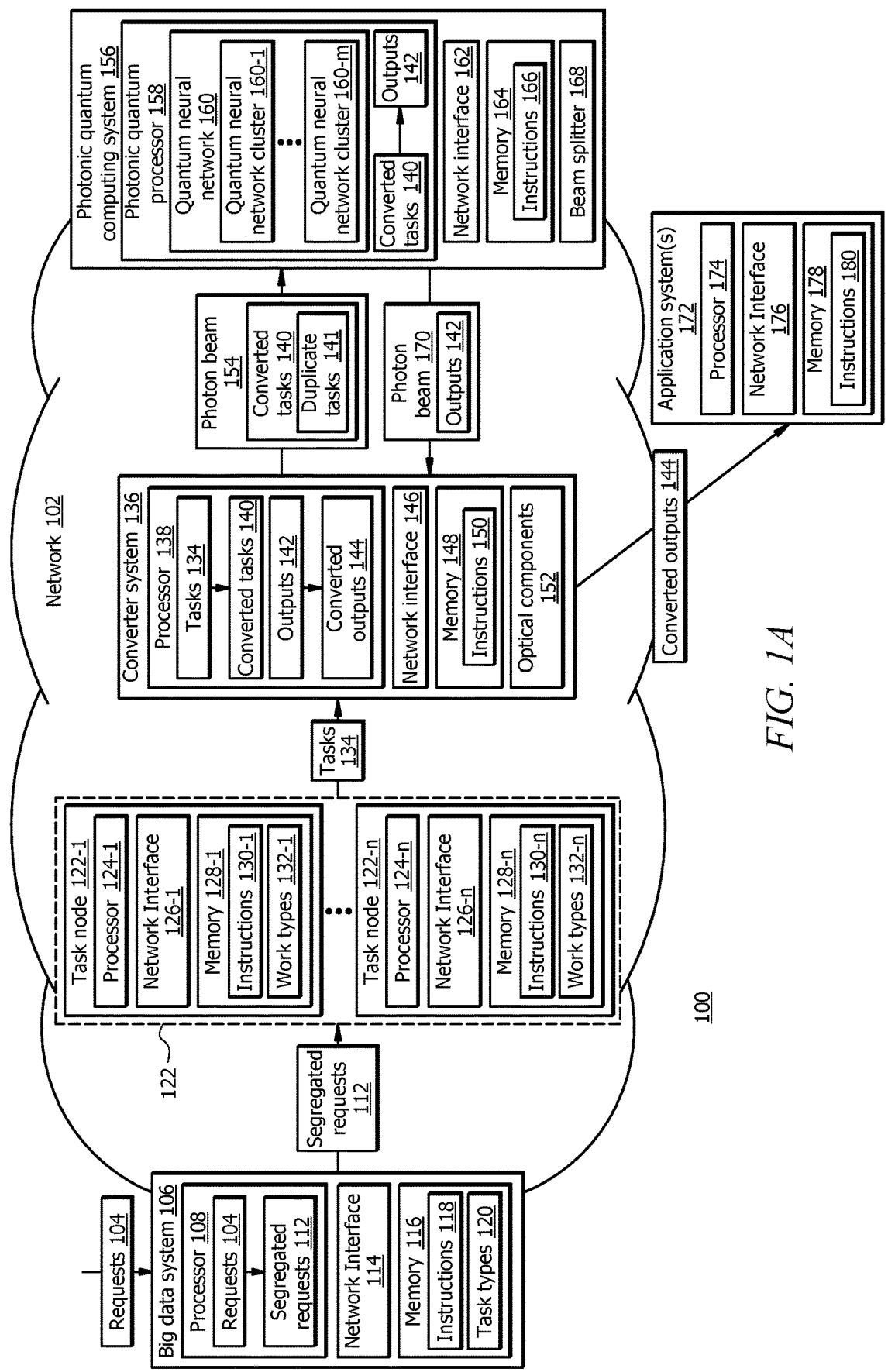
FIG. 1A illustrates an embodiment of a system configured for parallel data processing using photonic quantum computing.
Figure 1B:
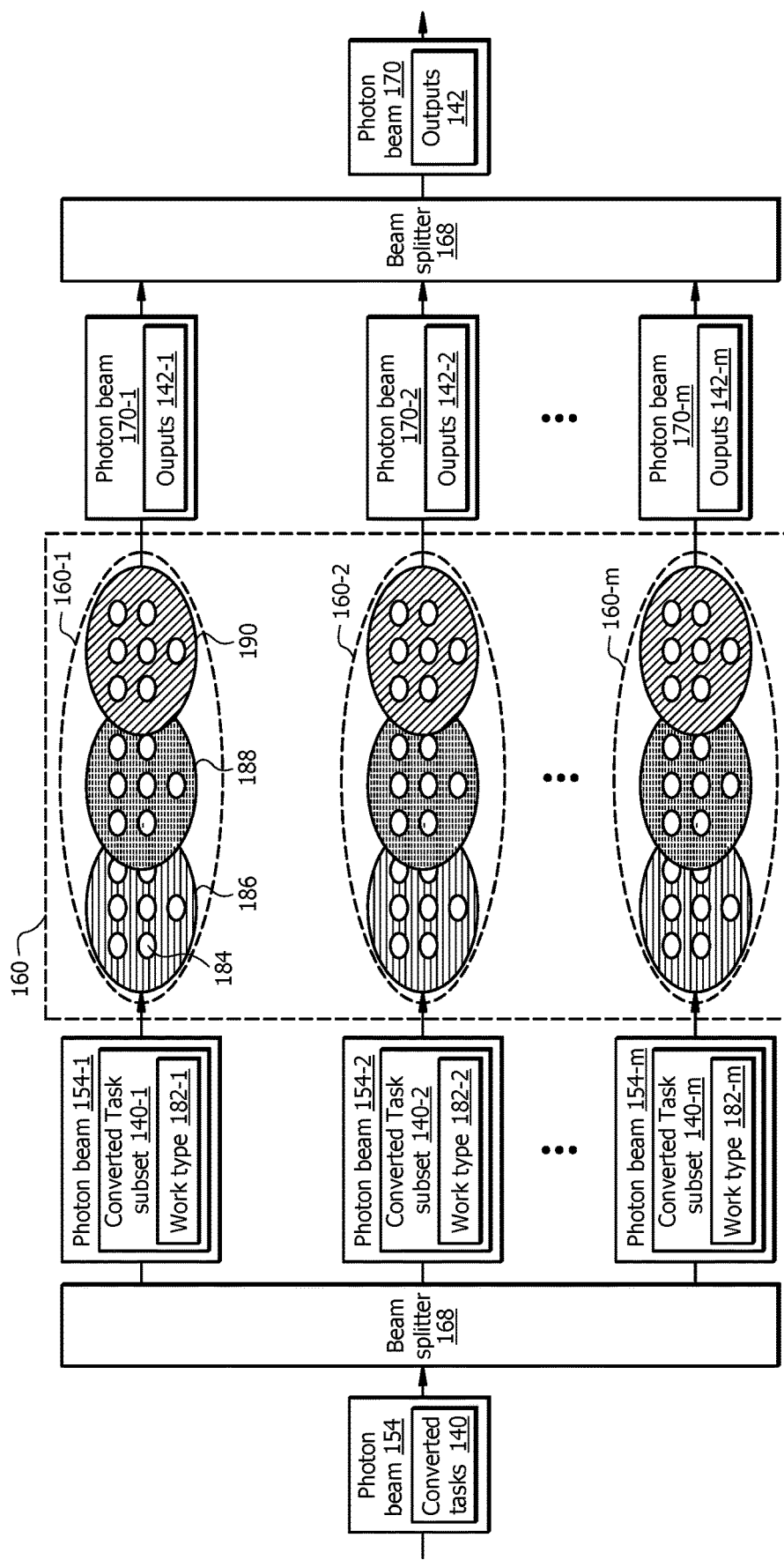
FIG. 1B illustrates an embodiment of a quantum neural network.
Figure 2:
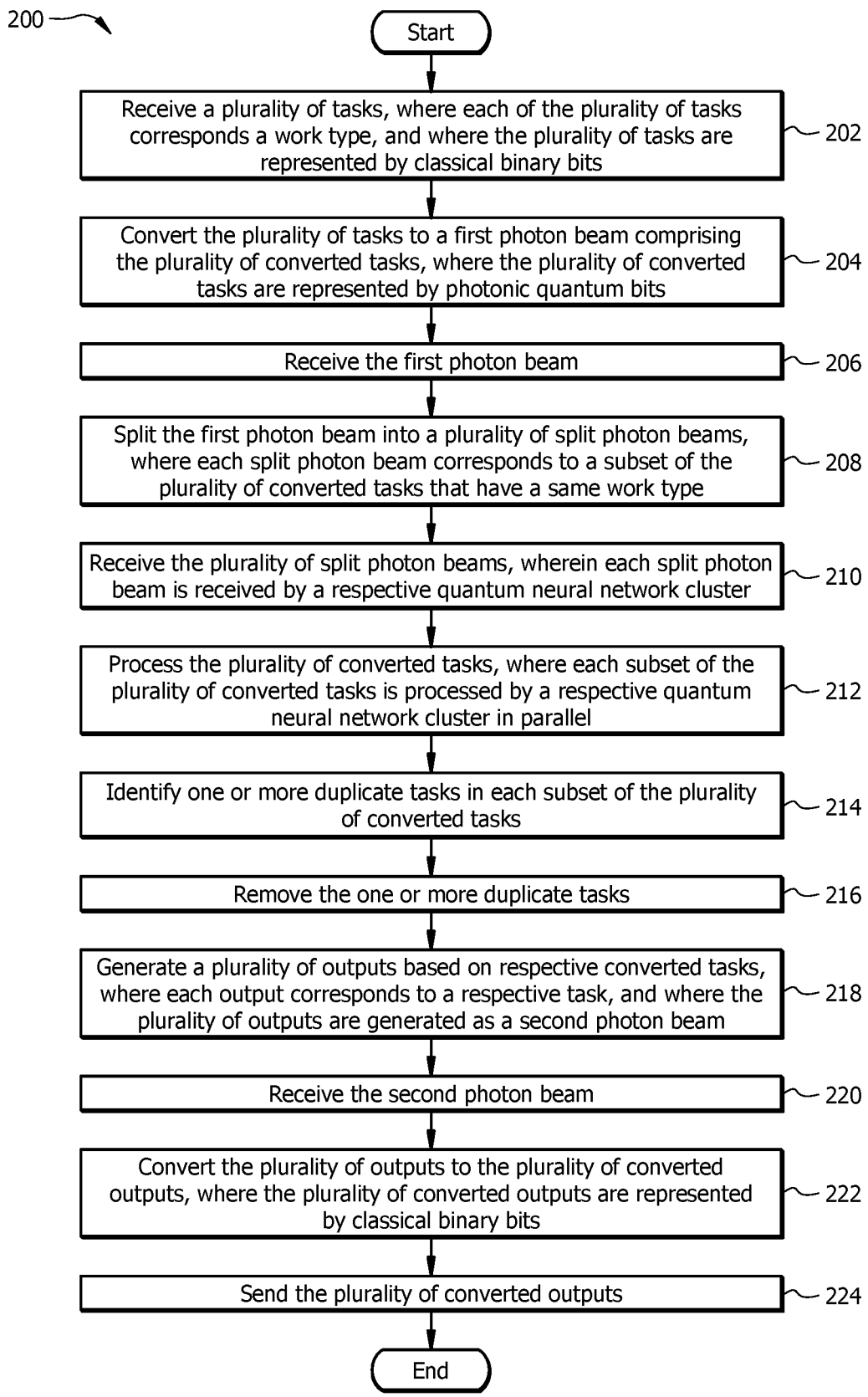
FIG. 2 illustrates an example operational flow of system of FIG. 1A for parallel data processing using photonic quantum computing.
Figure 3:
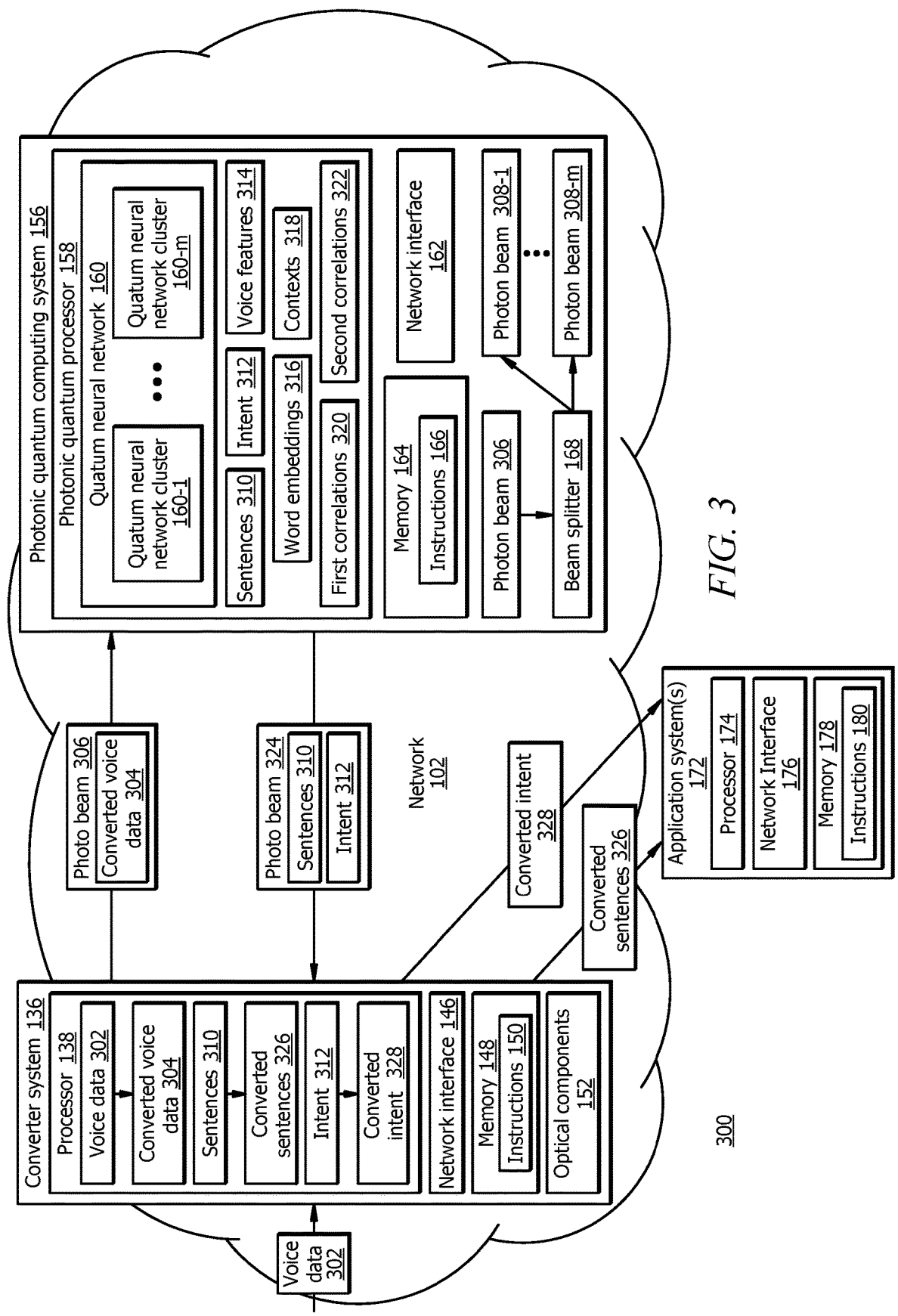
FIG. 3 illustrates an embodiment of a system configured for voice processing using photonic quantum computing.
Figure 4:
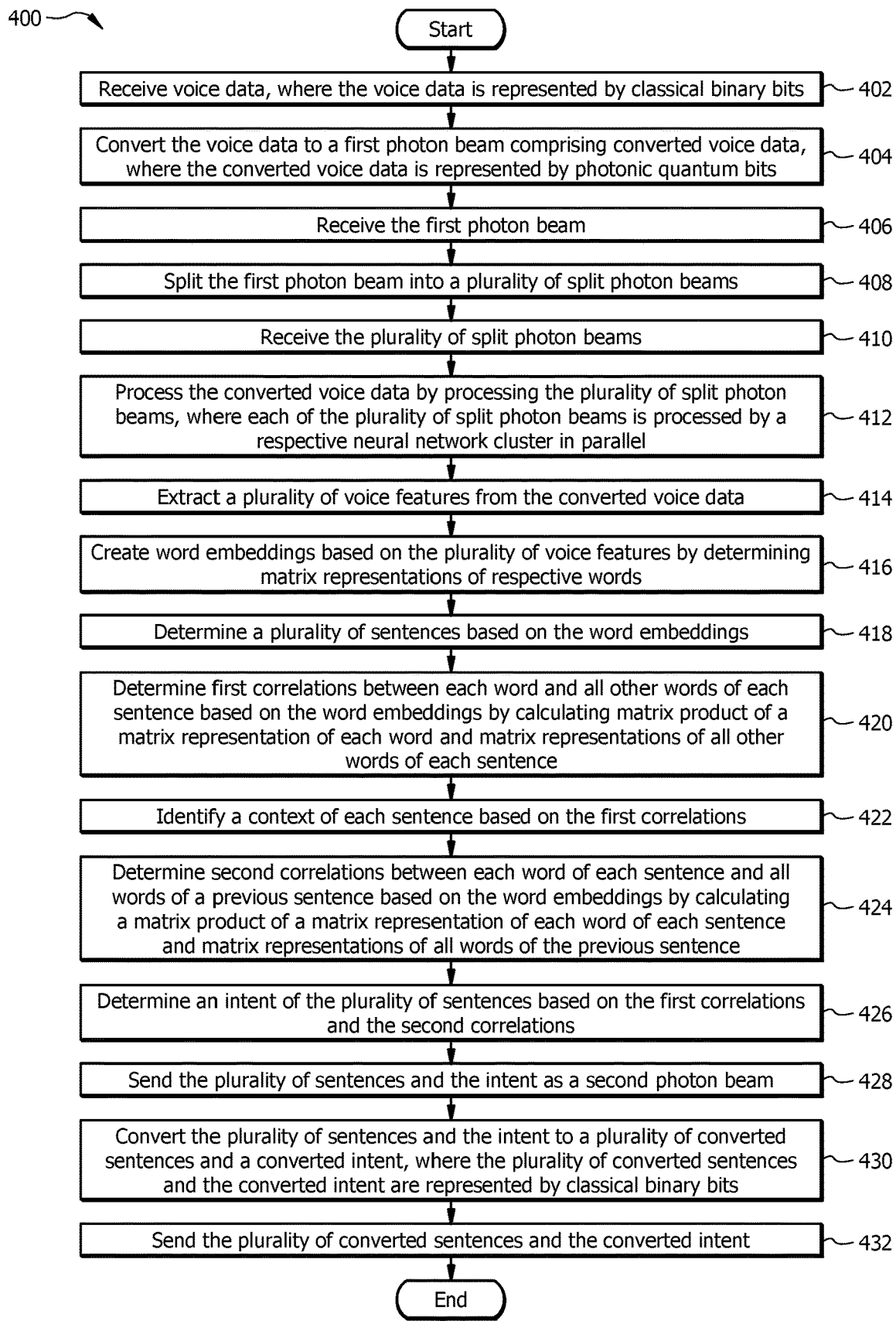
FIG. 4 illustrates an example operational flow of system of FIG. 3 for voice processing using photonic quantum computing.
Figure 5:
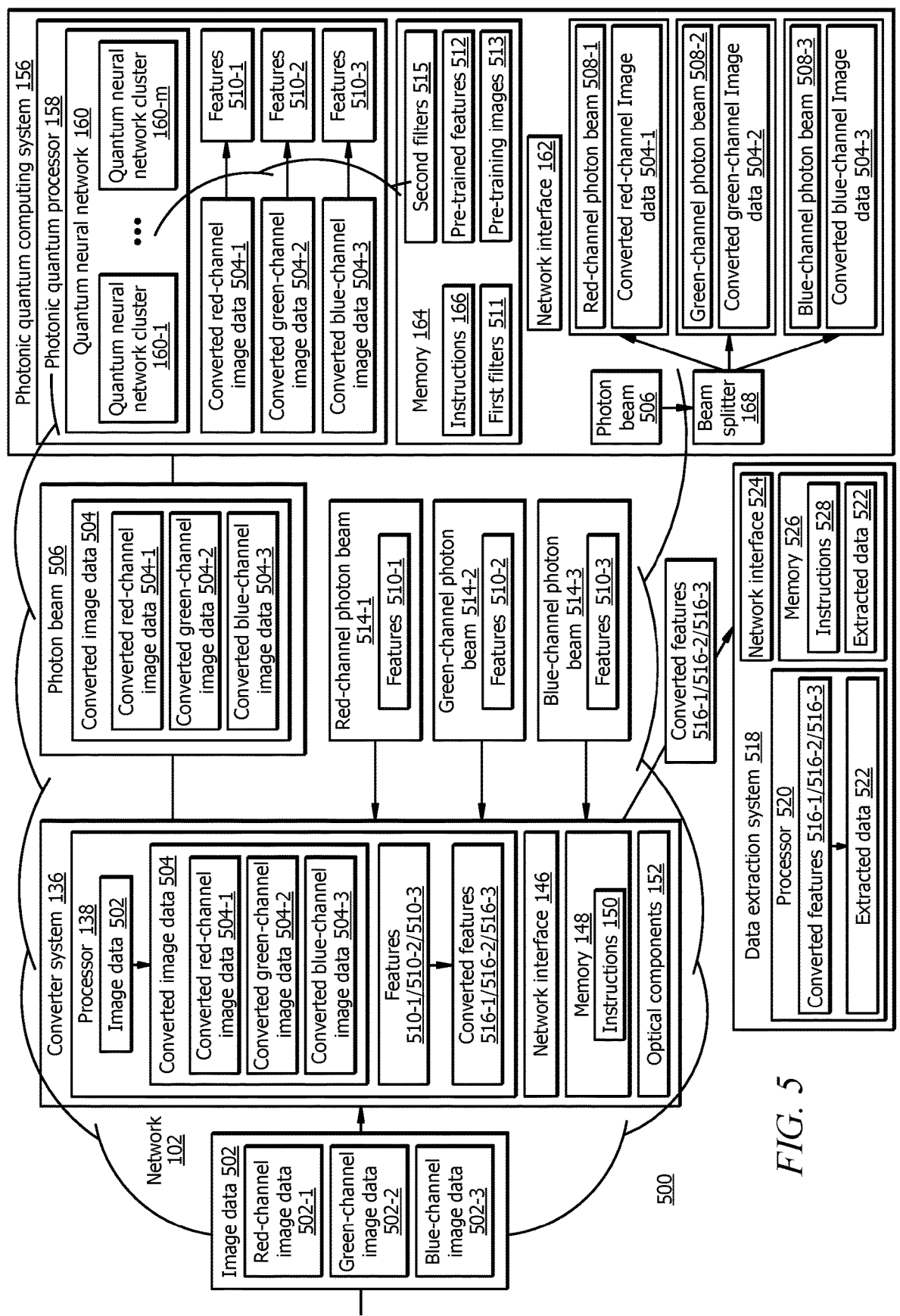
FIG. 5 illustrates an embodiment of a system configured for image processing using photonic quantum computing.
Figure 6A:
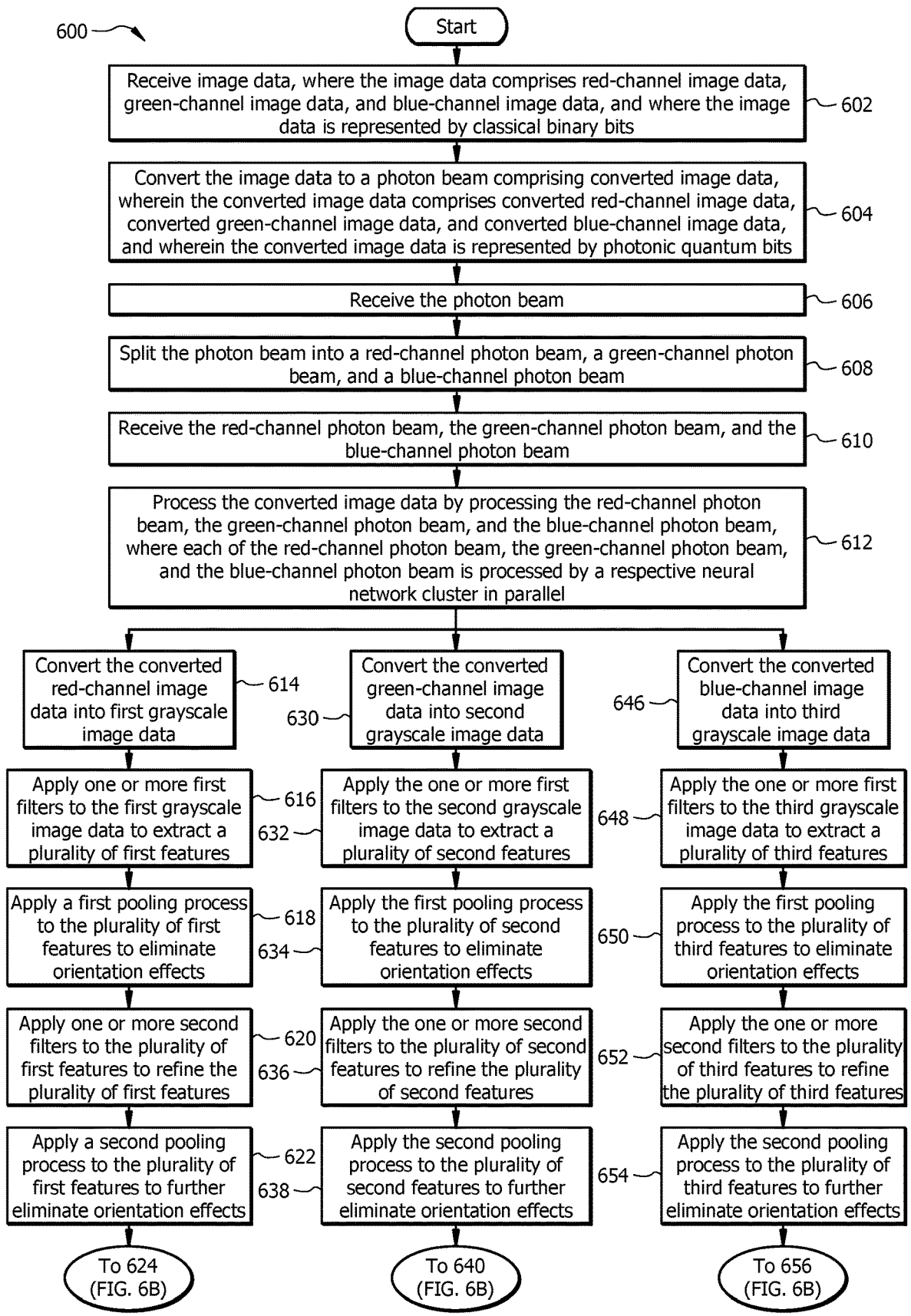
FIGS. 6A and 6B illustrate an example operational flow of system of FIG. 5 for image processing using photonic quantum computing.
Figure 6B:
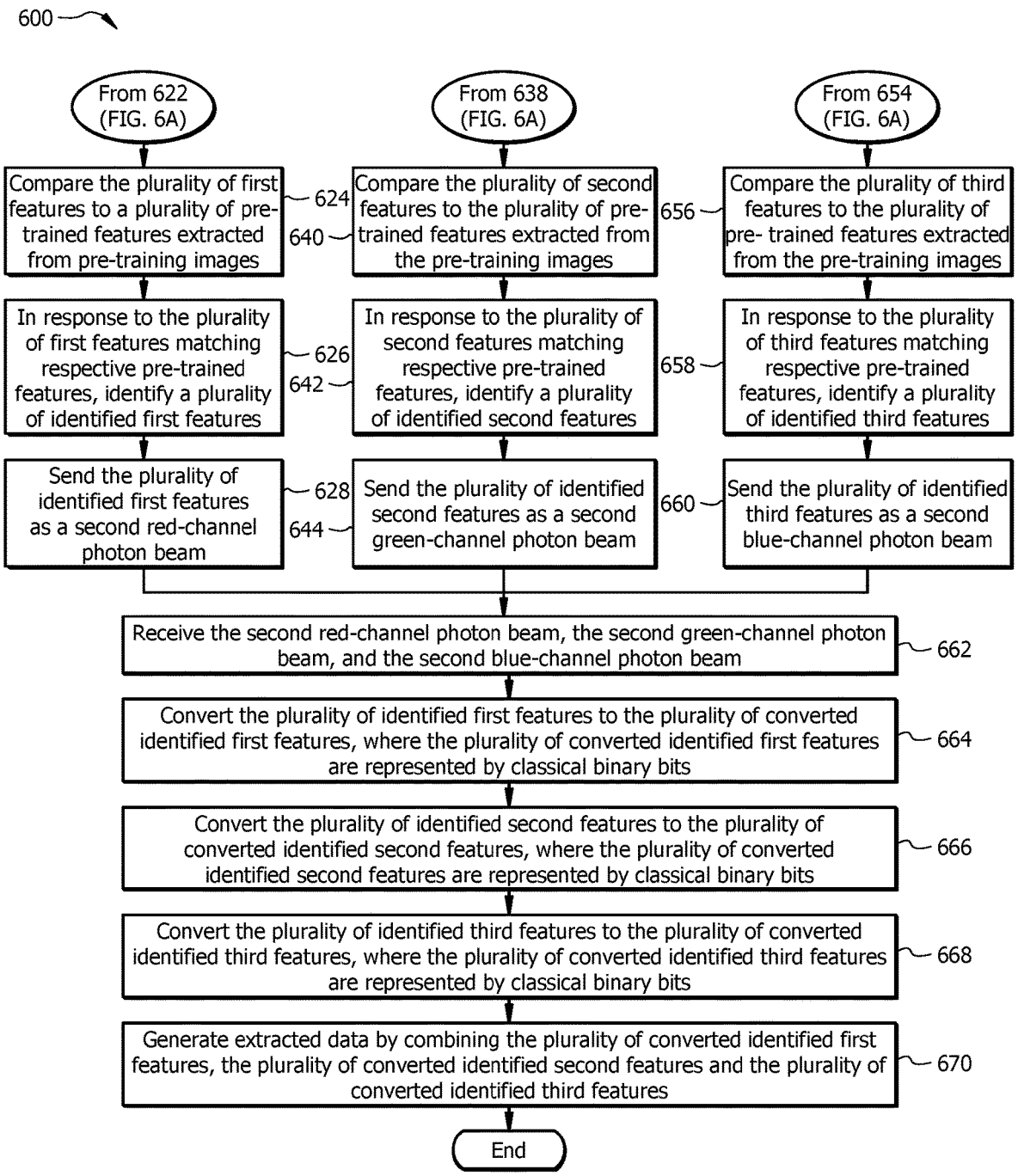

As described above, previous technologies fail to provide efficient solutions for parallel data processing, voice processing, and image processing. Embodiments of the present disclosure and its advantages may be understood by referring to FIGS. 1A, 1B and 2 through 5. FIGS. 1A, 1B and 2 are used to describe a system and method for parallel data processing using photonic quantum computing. FIGS. 3 and 4 are used to describe a system and method for voice processing using photonic quantum computing. FIGS. 5, 6A and 6B are used to describe a system and method for image processing using photonic quantum computing.

Overview of System Configured for Parallel Data Processing Using Photonic Quantum Computing FIG. 1A illustrates an embodiment of a system 100 that is generally configured for parallel data processing using photonic quantum computing. In particular, the system 100 may be configured to receive a plurality of requests 104 and process these requests 104 in parallel using a photonic quantum computing system 156.

In certain embodiments, the system 100 comprises a big data system 106, a plurality of task nodes 122, a converter system 136, a photonic quantum computing system 156, and one or more application systems 172 that are operably coupled to each other via a network 102. Network 102 enables the communication between the components of the system 100. In other embodiments, system 100 may not have all the components listed and/or may have other elements instead of, or in addition to, those listed above. For example, the converter system 136 may be integrated into the photonic quantum computing system 156. In certain embodiments, all components of system 100 may be integrated into a single system, with the single system including at least one classical processor and at least one photonic quantum processor.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

Big Data System

Big data system 106 is generally any device that is configured to process data and communicate with other components of the system 100 via the network 102. Big data system 106 comprises a processor 108 in signal communication with a memory 116 and a network interface 114.

Processor 108 comprises one or more processors operably coupled to the memory 116. The processor 108 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The one or more processors are configured to process data and may be implemented in hardware or software. For example, the processor 108 may be 8-bit, 16-bit, 32-bit, 64-bit, or of any other suitable architecture. The one or more processors are configured to implement various software instructions to perform the operations described herein. For example, the one or more processors are configured to execute software instructions 118 to perform one or more functions of the big data system 106 described herein. The processor 108 may be also referred to as a classical processor.

Network interface 114 is configured to enable wired and/or wireless communications (e.g., via network 102). The network interface 114 is configured to communicate data between the big data system 106 and other components of the system 100. For example, the network interface 114 may comprise a WIFI interface, a local area network (LAN) interface, a wide area network (WAN) interface, a modem, a switch, or a router. The processor 108 is configured to send and receive data using the network interface 114. The network interface 114 may be configured to use any suitable type of communication protocol as would be appreciated by one of ordinary skill in the art.

Memory 116 may be volatile or non-volatile and may comprise a read-only memory (ROM), random-access memory (RAM), ternary content-addressable memory (TCAM), dynamic random-access memory (DRAM), and static random-access memory (SRAM). Memory 116 may be implemented using one or more disks, tape drives, solid-state drives, and/or the like. The memory 116 is operable to store software instructions 118, and/or any other data and instructions. The software instructions 118 may comprise any suitable set of software instructions, logic, rules, or code operable to be executed by the processor 108 to perform one or more functions of the big data system 106 described herein.

In certain embodiments, the memory 116 is further operable to store task types 120. The task types 120 may comprise account maintenance, branch office support, client management, record keeping and billing, research and reconciliation, claims underwriting, risk governance/quality assurance, and/or analytics and reporting.

In certain embodiments, the big data system 106 may be configured to receive one or more requests 104. The requests 104 may be received from various intake channels, such as email, phone, world wide web, mobile devices, call centers, and/or the like. The request 104 may comprise various unstructured data, such as word documents, pdf documents, excel documents, verbal recordings, SQL queries, image/screenshot files, and/or the like. The big data system 106 may be further configured to segregate the requests 104 into segregated requests 112. The requests 104 may be segregated based on the task types 120.

Task Nodes

Task nodes 122 (e.g., task nodes 122-1 through 122-n) are generally any devices that are configured to process data and communicate with other components of the system 100 via the network 102. Each of the task nodes 122 comprises a respective one of processors 124 (e.g., processors 124-1 through 124-n) in signal communication with a respective one of memories 128 (e.g., memories 128-1 through 128-n) and a respective one of network interfaces 126 (e.g., network interfaces 126-1 through 126-n).

Each one of the processors 124 comprises one or more processors operably coupled to a respective one of the memories 128. Each one of the processors 124 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each one of the processors 124 may be a programmable logic device, a microcontroller, a microprocessor, or any suitable combination of the preceding. The one or more processors are configured to process data and may be implemented in hardware or software. For example, each one of the processors 124 may be 8-bit, 16-bit, 32-bit, 64-bit, or of any other suitable architecture. The one or more processors are configured to implement various software instructions to perform the operations described herein. For example, the one or more processors are configured to execute a respective one of software instructions 130 (e.g., software instructions 130-1 through 130-n) to perform one or more functions of the task nodes 122 described herein. The processors 124 may be also referred to as classical processors.

Each one of the network interfaces 126 is configured to enable wired and/or wireless communications (e.g., via network 102). Each one of the network interfaces 126 is configured to communicate data between a respective one of the task nodes 122 and other components of the system 100. For example, each one of the network interfaces 126 may comprise a WIFI interface, a local area network (LAN) interface, a wide area network (WAN) interface, a modem, a switch, or a router. Each one of the processors 124 is configured to send and receive data using a respective one of the network interfaces 126. Each one of the network interfaces 126 may be configured to use any suitable type of communication protocol as would be appreciated by one of ordinary skill in the art.

Each one of the memories 128 may be volatile or non-volatile and may comprise a read-only memory (ROM), random-access memory (RAM), ternary content-addressable memory (TCAM), dynamic random-access memory (DRAM), and static random-access memory (SRAM). Each one of the memories 128 may be implemented using one or more disks, tape drives, solid-state drives, and/or the like. Each one of the memories 128 is operable to store a respective one of the software instructions 130, and/or any other data and instructions. Each one of the software instructions 130 may comprise any suitable set of software instructions, logic, rules, or code operable to be executed by a respective one of the processors 124 to perform one or more functions of the task nodes 122 described herein.

In certain embodiments, each one of the memories 128 is further operable to store a respective one of the work types 132 (e.g., work types 132-1 through 132-n). Each one of the work types 132 may comprise data updating, data validation, financial reconciliation, report preparation, financial reporting, quality audit, brokerage calculation, and/or the like.

In certain embodiments, the task nodes 122 may be configured to receive the segregated requests 112, such that request of each task type are received by a respective one of the task nodes 122. The task nodes 122 may be further configured to generate tasks 134. In certain embodiments, each of the tasks 134 corresponds to a respective work type.

Converter System

Converter system 136 is generally any device that is configured to process data and communicate with other components of the system 100 via the network 102. Converter system 136 comprises a processor 138 in signal communication with a memory 148 and a network interface 146.

Processor 138 comprises one or more processors operably coupled to the memory 148. The processor 138 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 138 may be a programmable logic device, a microcontroller, a microprocessor, or any suitable combination of the preceding. The one or more processors are configured to process data and may be implemented in hardware or software. For example, the processor 138 may be 8-bit, 16-bit, 32-bit, 64-bit, or of any other suitable architecture. The one or more processors are configured to implement various software instructions to perform the operations described herein. For example, the one or more processors are configured to execute software instructions 150 to perform one or more functions of the converter system 136 described herein. The processor 138 may be also referred to as a classical processor.

Network interface 146 is configured to enable wired and/or wireless communications (e.g., via network 102). The network interface 146 is configured to communicate data between the converter system 136 and other components of the system 100. For example, the network interface 146 may comprise a WIFI interface, a local area network (LAN) interface, a wide area network (WAN) interface, a modem, a switch, or a router. The processor 138 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. The memory 148 is operable to store software instructions 150, and/or any other data and instructions. The software instructions 150 may comprise any suitable set of software instructions, logic, rules, or code operable to be executed by the processor 138 to perform one or more functions of the converter system 136 described herein.

The converter system 136 may be configured to convert data that is encoded by classical binary bits to converted data that is encoded by photonic quantum bits (qubits). In certain embodiments, the converter system 136 is configured to receive the tasks 134 from the task nodes 122 and convert the tasks 134 that are encoded by classical binary bits to converted tasks 140 that are encoded by photonic quantum bits. As such, the tasks 134 and respective converted tasks 140 comprise same information, but encoded by classical and photonic quantum bits, respectively. The converter system 136 is further configured to communicate the converted tasks 140 to the photonic quantum computing system 156 as a photon beam 154. The converter system 136 may comprise optical components 152 that are configured to generate the photon beam 154. The optical components 152 may comprise lasers, mirrors, lenses, prisms, polarizers, optical fibers, waveguides, photon detectors, beam splitters, and/or the like.

In certain embodiments, the converter system 136 is further configured to receive outputs 142 from the photonic quantum computing system 156 as a photon beam 170 and convert the outputs 142 that are encoded by photonic quantum bits to converted outputs 144 that are encoded by classical binary bits. As such, the outputs 142 and respective converted outputs 144 comprise same information, but encoded by photonic quantum bits and classical binary bits, respectively.

In certain embodiments, the converter system 136 is further configured to communicate the converted outputs 144 to one or more application systems 172 for further processing. The one or more application systems 172 may deliver services to respective requestors based on the converted outputs 144.

Photonic Quantum Computing System

Photonic quantum computing system 156 comprises a photonic quantum processor 158 in signal communication with a memory 164 and a network interface 162. Photonic quantum processor 158 may comprise a photon-based quantum device, with qubits implemented by modes of photons, for example. In certain embodiments, the photonic quantum processor 158 may be configured to implement a quantum neural network 160. The quantum neural network 160 may comprise a plurality of quantum neural network clusters 160-1 through 160-$m$. An embodiment of the quantum neural network 160 is illustrated in FIG. 1B. Each of the quantum neural network clusters 160-1 through 160-$m$ may comprise quantum neurons 184 that are grouped in layers, such as an input layer 186, one or more hidden layers 188, and an output layer 190.

Network interface 162 is configured to enable wired and/or wireless communications (e.g., via network 102). The network interface 162 is configured to communicate data between the photonic quantum computing system 156 and other components of the system 100. For example, the network interface 162 may comprise a WIFI interface, a local area network (LAN) interface, a wide area network (WAN) interface, a modem, a switch, or a router. The photonic quantum processor 158 is configured to send and receive data using the network interface 162. The network interface 162 may be configured to use any suitable type of communication protocol as would be appreciated by one of ordinary skill in the art.

Memory 164 may be volatile or non-volatile and may comprise a read-only memory (ROM), random-access memory (RAM), ternary content-addressable memory (TCAM), dynamic random-access memory (DRAM), and static random-access memory (SRAM). Memory 164 may be implemented using one or more disks, tape drives, solid-state drives, and/or the like. The memory 164 is operable to store software instructions 166, and/or any other data and instructions. The software instructions 166 may comprise any suitable set of software instructions, logic, rules, or code operable to be executed by the photon quantum processor 158 to perform one or more functions of the photonic quantum computing system 156 described herein. In an embodiment, the photon quantum processor 158 executes the software instructions 166 to implement the quantum neural network 160.

In certain embodiments, the photonic quantum computing system 156 may further comprise a beam splitter 168 that is configured to split the photon beam 154 into multiple photon beams.

In certain embodiments, the photonic quantum computing system 156 is configured to receive the photon beam 154 comprising the converted tasks 140. The beam splitter 168 receives the photon beam 154 and splits it into a plurality of photon beams 154-1 through 154-$m$. In certain embodiments, each of the plurality of photon beams 154-1 through 154-$m$ comprises a respective one of the converted task subsets 140-1 through 140-$m$, such that each of the converted task subsets 140-1 through 140-$m$ comprises tasks that have a same one of the work types 182-1 through 182-$m$.

Each of the plurality of photon beams 154-1 through 154-$m$ is received and processed by a respective one of the quantum neural network clusters 160-1 through 160-$m$ in parallel. Each of the quantum neural network clusters 160-1 through 160-$m$ identifies one or more duplicate tasks 141 in a respective one of the converted task subsets 140-1 through 140-$m$, removes the one or more duplicate tasks 141, and generates a respective one of outputs 142-1 through 142-$m$. In certain embodiments, the outputs 142-1 through 142-$m$ are generated as a plurality of photon beams 170-1 through 170-$m$. In certain embodiments, the beam splitter 168 combines the plurality of photon beams 170-1 through 170-$m$ into a single photon beam 170, such that the photon beam 170 comprises the outputs 142 (e.g., outputs 142-1 through 142-*m*). Each of the quantum neural network clusters 160-1 through 160-*m* may be pre-trained to perform tasks that have different work types.

Application Systems

One or more application systems 172 are generally any devices that are configured to process data and communicate with the components of the system 100 via the network 102. Each application system 172 comprises a processor 174 in signal communication with a memory 178 and a network interface 176.

Processor 174 comprises one or more processors operably coupled to the memory 178. The processor 174 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 174 may be a programmable logic device, a microcontroller, a microprocessor, or any suitable combination of the preceding. The one or more processors are configured to process data and may be implemented in hardware or software. For example, the processor 146 may be 8-bit, 16-bit, 32-bit, 64-bit, or of any other suitable architecture. The one or more processors are configured to implement various software instructions to perform the operations described herein. For example, the one or more processors are configured to execute software instructions 180 to perform one or more functions of the one or more application systems 172 described herein. The processor 174 may be also referred to as a classical processor.

Network interface 176 is configured to enable wired and/or wireless communications (e.g., via network 102). The network interface 176 is configured to communicate data between the application system 172 and the components of the system 100. For example, the network interface 176 may comprise a WIFI interface, a local area network (LAN) interface, a wide area network (WAN) interface, a modem, a switch, or a router. The processor 174 is configured to send and receive data using the network interface 176. The network interface 176 may be configured to use any suitable type of communication protocol as would be appreciated by one of ordinary skill in the art.

Memory 178 may be volatile or non-volatile and may comprise a read-only memory (ROM), random-access memory (RAM), ternary content-addressable memory (TCAM), dynamic random-access memory (DRAM), and static random-access memory (SRAM). Memory 178 may be implemented using one or more disks, tape drives, solid-state drives, and/or the like. The memory 178 is operable to store software instructions 180, and/or any other data and instructions. The software instructions 180 may comprise any suitable set of software instructions, logic, rules, or code operable to be executed by the processor 174 to perform one or more functions of the one or more application systems 172 described herein.

In certain embodiments, the one or more application systems 172 are configured to receive the converted outputs 144 from the converter system 136 for further processing. The one or more application systems 172 may deliver services to respective requestors based on the converted outputs 144.

Example Method for Parallel Data Processing Using Photonic Quantum Computing

FIG. 2 illustrates an example flowchart of a method 200 for parallel data processing using photonic quantum computing. Modifications, additions, or omissions may be made to method 200. Method 200 may include more, fewer, or other operations. For example, operations may be performed in parallel or in any suitable order. For example, one or more operations of method 200 may be implemented, at least in part, in the form of software instructions (e.g., instructions 118, 130-1 through 130-*n*, 150, 166 and 180 of FIG. 1), stored on non-transitory, tangible, machine-readable medium (e.g., memories 116, 128-1 through 128-*n*, 148, 164 and 178 of FIG. 1) that when executed by one or more processors (e.g., processors 108, 124-1 through 124-*n*, 138, 158 and 174 of FIG. 1) may cause the one or more processors to perform operations 202-224.

At operation 202, a converter system (e.g., converter system 136 of FIG. 1A) receives a plurality of tasks (e.g., tasks 134 of FIG. 1A), where each of the plurality of tasks corresponds a work type (e.g., work types 182 of FIG. 1B), and where the plurality of tasks are represented by classical binary bits. The work type may be data updating, data validation, financial reconciliation, report preparation, financial reporting, quality audit, brokerage calculation, and/or the like. At operation 204, the converter system converts the plurality of tasks to a first photon beam (e.g., photon beam 154 of FIG. 1A) comprising the plurality of converted tasks (e.g., converted tasks 140 of FIG. 1A), where the plurality of converted tasks are represented by photonic quantum bits.

At operation 206, a photonic quantum computing system (e.g., photonic quantum computing system 156 of FIG. 1A) receives the first photon beam.

At operation 208, a beam splitter (e.g., beam splitter 168 of FIGS. 1A and 1B) splits the first photon beam into a plurality of split photon beams (e.g., photon beams 154-1 through 154-*m* of FIG. 1B), where each split photon beam corresponds to a subset of the plurality of converted tasks (e.g., converted task subsets 140-1 through 140-*m* of FIG. 1B) that have a same work type (e.g., work type 182-1 through 182-*m* of FIG. 1B).

At operation 210, a quantum neural network (e.g., quantum neural network 160 of FIGS. 1A and 1B) receives the plurality of split photon beams, wherein each photon beam is received by a respective quantum neural network cluster (e.g., quantum neural network clusters 160-1 through 160-*m* of FIGS. 1A and 1B) of the quantum neural network.

At operation 212, the quantum neural network processes the plurality of converted tasks, where each subset of the plurality of converted tasks is processed by a respective quantum neural network cluster in parallel.

At operation 214, the quantum neural network identifies one or more duplicate tasks (e.g., duplicate tasks 141 of FIG. 1A) in each subset of the plurality of converted tasks.

At operation 216, the quantum neural network removes the one or more duplicate tasks.

At operation 218, the quantum neural network generates a plurality of outputs (e.g., outputs 142 of FIGS. 1A and 1B) based on respective converted tasks, where each output corresponds to a respective task, and where the plurality of outputs are generated as a second photon beam (e.g., photon beam 170 of FIGS. 1A and 1B).

At operation 220, the converter system receives the second photon beam.

At operation 222, the converter system converts the plurality of outputs to the plurality of converted outputs (e.g., converted outputs 144 of FIG. 1A), where the plurality of converted outputs are represented by classical binary bits.

At operation 224, the converter system sends the plurality of converted outputs to one or more application systems (e.g., one or more application systems 172 of FIG. 1A) for further processing. The one or more application systems may deliver services to respective requestors based on the converted outputs.

The method 200 provides one or more advantages. The method 200 is particularly integrated into practical applications of parallel data processing using photonic quantum computing. By using a photonic quantum computing system, a computing time may be reduced, which may in turn lead to overall reduction of computing resource utilization. In particular, various tasks may be performed in parallel, which in addition to quantum parallelization of the photonic quantum computing system, may lead to about 1000 times increase in computing speed. Accordingly, embodiments described herein provide improvements to an underlying computing system.

Overview of System Configured for Voice Processing Using Photonic Quantum Computing FIG. 3 illustrates an embodiment of a system 300 that is generally configured for voice processing using photonic quantum computing. In particular, the system 300 may be configured to process voice data 302 using a photonic quantum computing system 156 to extract desired information (e.g., converted sentences 326 and converted intent 328).

In certain embodiments, the system 300 comprises a converter system 136, a photonic quantum computing system 156, and one or more application systems 172 that are operably coupled to each other via a network 102. Network 102 enables the communication between the components of the system 300. In other embodiments, system 300 may not have all the components listed and/or may have other elements instead of, or in addition to, those listed above. For example, the converter system 136 may be integrated into the photonic quantum computing system 156. In certain embodiments, all components of system 300 may be integrated into a single system, with the single system including at least one classical processor and at least one photonic quantum processor.

System Components
Network

Network 102 has been described in detail with reference to FIG. 1A and the description is not repeated herein.

Converter System

Converter system 136 is generally any device that is configured to process data and communicate with other components of the system 100 via the network 102. Converter system 136 comprises a processor 138 in signal communication with a memory 148 and a network interface 146. The memory 148 is operable to store software instructions 150, and/or any other data and instructions. The software instructions 150 may comprise any suitable set of software instructions, logic, rules, or code operable to be executed by the processor 138 to perform one or more functions of the converter system 136 described herein. The processor 138, the memory 148, the network interface 146, and the software instructions 150 have been described in detail with reference to FIG. 1A, and the description is not repeated herein.

The converter system 136 may be configured to convert data that is encoded by classical binary bits to converted data that is encoded by photonic quantum bits (qubits). In certain embodiments, the converter system 136 is configured to receive voice data 302 and convert the voice data 302 that is encoded by classical binary bits to converted voice data 304 that is encoded by photonic quantum bits. As such, the voice data 302 and the converted voice data 304 comprise same information, but encoded by classical binary bits and photonic quantum bits, respectively. The converter system 136 is further configured to communicate the converted voice data 304 to the photonic quantum computing system 156 as a photon beam 306. The converter system 136 may comprise optical components 152 that are configured to generate the photon beam 306. The optical components 152 may comprise lasers, mirrors, lenses, prisms, polarizers, optical fibers, waveguides, photon detectors, beam splitters, and/or the like.

In certain embodiments, the converter system 136 is further configured receive to a plurality of sentences 310 and an intent 312 from the photonic quantum computing system 156 as a photon beam 324 and convert the plurality of sentences 310 and the intent 312 that are encoded by photonic quantum bits to a plurality of converted sentences 326 and a converted intent 328, respectively, that are encoded by classical binary bits. As such, the plurality of sentences 310 and the plurality of converted sentences 326 comprise same information, but encoded by photonic quantum bits and classical binary bits, respectively. Furthermore, the intent 312 and the converted intent 328 comprise same information, but encoded by photonic quantum bits and classical binary bits, respectively.

In certain embodiments, the converter system 136 is further configured to communicate the plurality of converted sentences 326 and the converted intent 328 to the one or more application systems 172 for further processing. In an embodiment when the plurality of converted sentences 326 and the converted intent 328 comprise a request, the one or more application systems 172 may deliver services to respective requestors based on the plurality of converted sentences 326 and the converted intent 328.

Photonic Quantum Computing System

Photonic quantum computing system 156 comprises a photonic quantum processor 158 in signal communication with a memory 164 and a network interface 162. The memory 164 is operable to store software instructions 166, and/or any other data and instructions. The software instructions 166 may comprise any suitable set of software instructions, logic, rules, or code operable to be executed by the photon quantum processor 158 to perform one or more functions of the photonic quantum computing system 156 described herein. In an embodiment, the photon quantum processor 158 executes the software instructions 166 to implement the quantum neural network 160. The photonic quantum processor 158, the memory 164, the network interface 162, the software instructions 166, and the quantum neural network 160 have been described in detail with reference to FIGS. 1A and 1B, and the description is not repeated herein. In certain embodiments, the photonic quantum computing system 156 may further comprise a beam splitter 168 that is configured to split the photon beam 506 into multiple photon beams.

In certain embodiments, the photonic quantum computing system 156 is configured to receive the photon beam 306 comprising the converted voice data 304. The beam splitter 168 receives the photon beam 306 and splits it into a plurality of split photon beams 308-1 through 308-*m*. Each of the split photon beams 308-1 through 308-*m* is received and processed by a respective one of the quantum neural network clusters 160-1 through 160-*m* in parallel. The photonic quantum processor 158 extracts a plurality of voice features 314 from the converted voice data. The voice features may comprise a frequency, a pitch, an amplitude, a zero crossing rate, a root mean square energy, a mel spectrogram, a band energy ratio, and/or a spectral centroid. The photonic quantum processor 158 creates word embeddings 316 based on the plurality of voice features 314 by determining matrix representations of respective words. The photonic quantum processor 158 determines a plurality of sentences 310 based on the word embeddings 316. The photonic quantum processor 158 determines first correlations 320 between each word and all other words of each sentence based on the word embeddings by calculating matrix product of a matrix representation of each word and matrix representations of all other words of each sentence. The photonic quantum processor 158 identifies a context 318 of each sentence based on the first correlations 320. The photonic quantum processor 158 determines second correlations 322 between each word of each sentence and all words of a previous sentence based on the word embeddings by calculating a matrix product of a matrix representation of each word of each sentence and matrix representations of all words of the previous sentence. The photonic quantum processor 158 determines an intent 312 of the plurality of sentences based on the first correlations 320 and the second correlations 322. The photonic quantum processor 158 sends the plurality of sentences 310 and the intent 312 to the converter system 136 as a photon beam 324.

Application Systems

One or more application systems 172 are generally any devices that are configured to process data and communicate with the components of the system 100 via the network 102. Each application system 172 comprises a processor 174 in signal communication with a memory 178 and a network interface 176. The memory 178 is operable to store software instructions 180, and/or any other data and instructions. The software instructions 180 may comprise any suitable set of software instructions, logic, rules, or code operable to be executed by the processor 174 to perform one or more functions of the one or more application systems 172 described herein. The processor 174, the memory 178, the network interface 176, and the software instructions 180 have been described in detail with reference to FIG. 1A, and the description is not repeated herein.

In certain embodiments, the one or more application systems 172 are configured to receive the plurality of converted sentences 326 and the converted intent 328 from the converter system 136 for further processing. The one or more application systems 172 may deliver services to respective requestors based on the plurality of converted sentences 326 and the converted intent 328.

Example Method for Voice Processing Using Photonic Quantum Computing

FIG. 4 illustrates an example flowchart of a method 400 for voice processing using photonic quantum computing. Modifications, additions, or omissions may be made to method 400. Method 400 may include more, fewer, or other operations. For example, operations may be performed in parallel or in any suitable order. For example, one or more operations of method 400 may be implemented, at least in part, in the form of software instructions (e.g., instructions 150, 166 and 180 of FIG. 3), stored on non-transitory, tangible, machine-readable medium (e.g., memories 148, 164 and 178 of FIG. 3) that when executed by one or more processors (e.g., processors 138, 158 and 174 of FIG. 3) may cause the one or more processors to perform operations 402-432.

At operation 402, a converter system (e.g., converter system 136 of FIG. 3) receives voice data (e.g., voice data 302 of FIG. 3), where the voice data is represented by classical binary bits.

At operation 404, the converter system converts the voice data to a first photon beam (e.g., photon beam 306 of FIG. 3) comprising converted voice data (e.g., converted voice data 304 of FIG. 3), where the converted voice data is represented by photonic quantum bits.

At operation 406, a photonic quantum computing system (e.g., photonic quantum computing system 156 of FIG. 3) receives the first photon beam.

At operation 408, a beam splitter (e.g., beam splitter 168 of FIG. 3) splits the first photon beam into a plurality of split photon beams (e.g., photon beams 308-1 through 308-m of FIG. 3).

At operation 410, a photonic quantum processor (e.g., photonic quantum processor 158 of FIG. 3) receives the plurality of split photon beams.

At operation 412, the photonic quantum processor processes the converted voice data by processing the plurality of split photon beams, where each of the plurality of split photon beams is processed by a respective neural network cluster (e.g., neural network clusters 160-1 through 160-m of FIG. 3) in parallel.

At operation 414, the photonic quantum processor extracts a plurality of voice features (e.g., voice features 314 of FIG. 3) from the converted voice data. The voice features may comprise a frequency, a pitch, an amplitude, a zero crossing rate, a root mean square energy, a mel spectrogram, a band energy ratio, and/or a spectral centroid.

At operation 416, the photonic quantum processor creates word embeddings (e.g., word embeddings 316 of FIG. 3) based on the plurality of voice features by determining matrix representations of respective words.

At operation 418, the photonic quantum processor determines a plurality of sentences (e.g., sentences 310 of FIG. 3) based on the word embeddings.

At operation 420, the photonic quantum processor determines first correlations (e.g., first correlations 320 of FIG. 3) between each word and all other words of each sentence based on the word embeddings by calculating matrix product of a matrix representation of each word and matrix representations of all other words of each sentence.

At operation 422, the photonic quantum processor identifies a context (e.g., context 318 of FIG. 3) of each sentence based on the first correlations.

At operation 424, the photonic quantum processor determines second correlations (e.g., second correlations 322 of FIG. 3) between each word of each sentence and all words of a previous sentence based on the word embeddings by calculating a matrix product of a matrix representation of each word of each sentence and matrix representations of all words of the previous sentence.

At operation 426, the photonic quantum processor determines an intent (e.g., intent 312 of FIG. 3) of the plurality of sentences based on the first correlations and the second correlations.

At operation 428, the photonic quantum processor sends the plurality of sentences and the intent to the converter system as a second photon beam (e.g., photon beam 324 of FIG. 3).

At operation 430, the converter system converts the plurality of sentences and the intent to a plurality of converted sentences (e.g., converted sentences 326 of FIG. 3) and a converted intent (e.g., converted intent 328 of FIG. 3), where the plurality of converted sentences and the converted intent are represented by classical binary bits.

At operation 432, the converter system sends the plurality of converted sentences and the converted intent to an application system (e.g., application system 172 of FIG. 3) for further processing. The one or more application systems may deliver services to respective requestors based on the plurality of converted sentences and the converted intent.

The method 400 provides one or more advantages. The method 400 is particularly integrated into practical applications of voice processing using photonic quantum computing. By using a photonic quantum computing system, a computing time may be reduced, which may in turn lead to overall reduction of computing resource utilization. In particular, various computation tasks may be performed in parallel by the photonic quantum computing system, which may lead to about 1000 times increase in computing speed. Accordingly, embodiments described herein provide improvements to an underlying computing system.

Overview of System Configured for Image Processing Using Photonic Quantum Computing FIG. 5 illustrates an embodiment of a system 500 that is generally configured for image processing using photonic quantum computing. In particular, the system 500 may be configured to process image data 502 using a photonic quantum computing system 156 to extract desired information (e.g., extracted data 522).

In certain embodiments, the system 500 comprises a converter system 136, a photonic quantum computing system 156, and a data extraction system 518 that are operably coupled to each other via a network 102. Network 102 enables the communication between the components of the system 500. In other embodiments, system 500 may not have all the components listed and/or may have other elements instead of, or in addition to, those listed above. For example, the converter system 136 may be integrated into the photonic quantum computing system 156. In certain embodiments, all components of system 500 may be integrated into a single system, with the single system including at least one classical processor and at least one photonic quantum processor.

System Components

Network

Network 102 has been described in detail with reference to FIG. 1A and the description is not repeated herein.

Converter System

Converter system 136 is generally any device that is configured to process data and communicate with other components of the system 100 via the network 102. Converter system 136 comprises a processor 138 in signal communication with a memory 148 and a network interface 146. The memory 148 is operable to store software instructions 150, and/or any other data and instructions. The software instructions 150 may comprise any suitable set of software instructions, logic, rules, or code operable to be executed by the processor 138 to perform one or more functions of the converter system 136 described herein. The processor 138, the memory 148, the network interface 146, and the software instructions 150 have been described in detail with reference to FIG. 1A, and the description is not repeated herein.

The converter system 136 may be configured to convert data that is encoded by classical binary bits to converted data that is encoded by photonic quantum bits (qubits). In certain embodiments, the converter system 136 is configured to receive image data 502 and convert the image data 502 that is encoded by classical binary bits to converted image data 504 that is encoded by photonic quantum bits. As such, the image data 502 and the converted image data 504 comprise same information, but encoded by classical binary bits and photonic quantum bits, respectively. The converter system 136 is further configured to communicate the converted image data 504 to the photonic quantum computing system 156 as a photon beam 506. The converter system 136 may comprise optical components 152 that are configured to generate the photon beam 506. The optical components 152 may comprise lasers, mirrors, lenses, prisms, polarizers, optical fibers, waveguides, photon detectors, beam splitters, and/or the like.

In certain embodiments, the image data 502 may be split into red-channel image data 502-1, green-channel image data 502-2 and blue-channel image data 502-3. In such embodiments, the converted image data 504 comprises converted red-channel image data 504-1, converted green-channel image data 504-2 and converted blue-channel image data 504-3.

In certain embodiments, the converter system 136 is further configured to receive features 510-1, 510-2 and 510-3 from the photonic quantum computing system 156 as a red-channel photon beam 514-1, a green-channel photon beam 514-2 and a blue channel photon beam, respectively, and convert the features 510-1, 510-2 and 510-3 that are encoded by photonic quantum bits to converted features 516-1, 516-2 and 516-3, respectively, that are encoded by classical binary bits. As such, the features 510-1, 510-2 and 510-3 and the converted features 516-1, 516-2 and 516-3 comprise same information, but encoded by photonic quantum bits and classical binary bits, respectively.

In certain embodiments, the converter system 136 is further configured to communicate the converted features 516-1, 516-2 and 516-3 to the data extraction system 518 for further processing. The data extraction system 518 generates extracted data 522 from the converted features 516-1, 516-2 and 516-3 and stores the extracted data 522 in a memory 526.

Photonic Quantum Computing System

Photonic quantum computing system 156 comprises a photonic quantum processor 158 in signal communication with a memory 164 and a network interface 162. The memory 164 is operable to store software instructions 166, and/or any other data and instructions. The software instructions 166 may comprise any suitable set of software instructions, logic, rules, or code operable to be executed by the photon quantum processor 158 to perform one or more functions of the photonic quantum computing system 156 described herein. In an embodiment, the photon quantum processor 158 executes the software instructions 166 to implement the quantum neural network 160. The photonic quantum processor 158, the memory 164, the network interface 162, the software instructions 166, and the quantum neural network 160 have been described in detail with reference to FIGS. 1A and 1B, and the description is not repeated herein. In certain embodiments, the photonic quantum computing system 156 may further comprise a beam splitter 168 that is configured to split the photon beam 506 into multiple photon beams.

In certain embodiments, the photonic quantum computing system 156 is configured to receive the photon beam 506 comprising the converted image data 504. The beam splitter 168 receives the photon beam 506 and splits it into a red-channel photon beam 508-1, a green-channel photon beam 508-2, and a blue-channel photon beam 508-3, such that the red-channel photon beam 508-1 comprises the converted red-channel image data 504-1, a green-channel photon beam 508-2 comprises the converted green-channel image data 504-2, and a blue-channel photon beam 508-3 comprises the converted blue-channel image data 504-3. Each of the red-channel photon beam 508-1, the green-channel photon beam 508-2, and the blue-channel photon beam 508-3, is received and processed by a respective one of the quantum neural network clusters 160-1 through 160-*m* in parallel.

The photonic quantum processor 158 converts the converted red-channel image data 504-1 into first grayscale image data. The photonic quantum processor applies one or more first filters 511 to the first grayscale image data to extract a plurality of first features 510-1. In an embodiment when the image data 502 comprises a text, the plurality of first features 510-1 may comprise individual characters, or one or more strokes for each character. The photonic quantum processor 158 applies a first pooling process to the plurality of first features 510-1 to eliminate orientation effects. The photonic quantum processor 158 applies one or more second filters 515 to the plurality of first features 510-1 to refine the plurality of first features 510-1. The photonic quantum processor 158 applies a second pooling process to the plurality of first features 510-1 to further eliminate orientation effects. The photonic quantum processor 158 compares the plurality of first features 510-1 to a plurality of pre-trained features 512 that are extracted from pre-training images 513. In response to the plurality of first features 510-1 matching respective pre-trained features 512, the photonic quantum processor 158 identifies a plurality of identified first features 510-1. The photonic quantum processor 158 sends the plurality of identified first features 510-1 to the converter system 136 as a second red-channel photon beam 514-1.

The photonic quantum processor 158 converts the converted green-channel image data 504-2 into second grayscale image data. The photonic quantum processor 158 applies the one or more first filters 511 to the second grayscale image data to extract a plurality of second features 510-2. In an embodiment when the image data 502 comprises a text, the plurality of second features 510-2 may comprise individual characters, or one or more strokes for each character. The photonic quantum processor 158 applies the first pooling process to the plurality of second features 510-2 to eliminate orientation effects. The photonic quantum processor 158 applies the one or more second filters 515 to the plurality of second features 510-2 to refine the plurality of second features. The photonic quantum processor 158 applies the second pooling process to the plurality of second features 510-2 to further eliminate orientation effects. The photonic quantum processor 158 compares the plurality of second features 510-2 to the plurality of pre-trained features 512 that are extracted from the pre-training images 513. In response to the plurality of second features 510-2 matching respective pre-trained features 512, the photonic quantum processor 158 identifies a plurality of identified second features 510-2. The photonic quantum processor 158 sends the plurality of identified second features 510-2 to the converter system 136 as a second green-channel photon beam 514-2.

The photonic quantum processor 158 converts the converted blue-channel image data 504-3 into third grayscale image data. The photonic quantum processor 158 applies the one or more first filters 511 to the third grayscale image data to extract a plurality of third features 510-3. In an embodiment when the image data 502 comprises a text, the plurality of third features 510-3 may comprise individual characters, or one or more strokes for each character. The photonic quantum processor 158 applies the first pooling process to the plurality of third features 510-3 to eliminate orientation effects. The photonic quantum processor 158 applies the one or more second filters 513 to the plurality of third features 510-3 to refine the plurality of third features 510-3. The photonic quantum processor 158 applies the second pooling process to the plurality of third features 510-3 to further eliminate orientation effects. The photonic quantum processor 158 compares the plurality of third features 510-3 to the plurality of pre-trained features 512 that are extracted from the pre-training images 513. In response to the plurality of third features 510-3 matching respective pre-trained features 512, the photonic quantum processor 158 identifies a plurality of identified third features 510-3. The photonic quantum processor 158 sends the plurality of identified third features 510-3 to the converter system 136 as a second blue-channel photon beam 514-3.

Data Extraction Systems

Data extraction system 518 are generally any devices that are configured to process data and communicate with the components of the system 500 via the network 102. Data extraction system 518 comprises a processor 520 in signal communication with a memory 526 and a network interface 524.

Processor 520 comprises one or more processors operably coupled to the memory 526. The processor 520 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 520 may be a programmable logic device, a microcontroller, a microprocessor, or any suitable combination of the preceding. The one or more processors are configured to process data and may be implemented in hardware or software. For example, the processor 520 may be 8-bit, 16-bit, 32-bit, 64-bit, or of any other suitable architecture. The one or more processors are configured to implement various software instructions to perform the operations described herein. For example, the one or more processors are configured to execute software instructions 528 to perform one or more functions of the data extraction system 518 described herein. The processor 520 may be also referred to as a classical processor.

Network interface 524 is configured to enable wired and/or wireless communications (e.g., via network 102). The network interface 524 is configured to communicate data between the data extraction system 518 and the components of the system 500. For example, the network interface 524 may comprise a WIFI interface, a local area network (LAN) interface, a wide area network (WAN) interface, a modem, a switch, or a router. The processor 520 is configured to send and receive data using the network interface 524. The network interface 524 may be configured to use any suitable type of communication protocol as would be appreciated by one of ordinary skill in the art.

Memory 526 may be volatile or non-volatile and may comprise a read-only memory (ROM), random-access memory (RAM), ternary content-addressable memory (TCAM), dynamic random-access memory (DRAM), and static random-access memory (SRAM). Memory 526 may be implemented using one or more disks, tape drives, solid-state drives, and/or the like. The memory 526 is operable to store software instructions 528, and/or any other data and instructions. The software instructions 528 may comprise any suitable set of software instructions, logic, rules, or code operable to be executed by the processor 520 to perform one or more functions of the data extraction system 518 described herein.

In certain embodiments, the data extraction system 518 is configured to receive the converted features 516-1, 516-2 and 516-3 from the converter system 136 for further processing. The data extraction system 518 generates extracted data 522 from the converted features 516-1, 516-2 and 516-3 and stores the extracted data 522 in the memory 526. In certain embodiments, the data extraction system 518 generates the extracted data 522 by combining the converted features 516-1, 516-2 and 516-3.

Example Method for Image Processing Using Photonic Quantum Computing

FIGS. 6A and 6B illustrate an example flowchart of a method 600 for image processing using photonic quantum computing. Modifications, additions, or omissions may be made to method 600. Method 600 may include more, fewer, or other operations. For example, operations may be performed in parallel or in any suitable order. For example, one or more operations of method 600 may be implemented, at least in part, in the form of software instructions (e.g., instructions 150, 166 and 528 of FIG. 5), stored on non-transitory, tangible, machine-readable medium (e.g., memories 148, 164 and 526 of FIG. 5) that when executed by one or more processors (e.g., processors 138, 158 and 520 of FIG. 5) may cause the one or more processors to perform operations 602-670.

At operation 602, a converter system (e.g., converter system 136 of FIG. 5) receives image data (e.g., image data 502 of FIG. 5), where the image data comprises red-channel image data (e.g., red-channel image data 502-1 of FIG. 5), green-channel image data (e.g., green-channel image data 502-2 of FIG. 5), and blue-channel image data (e.g., blue-channel image data 502-3 of FIG. 5), and where the image data is represented by classical binary bits.

At operation 604, the converter system converts the image data to a photon beam (e.g., photon beam 506 of FIG. 5) comprising converted image data (e.g., converted image data 504 of FIG. 5), where the converted image data comprises converted red-channel image data (e.g., converted red-channel image data 504-1 of FIG. 5), converted green-channel image data (e.g., converted green-channel image data 504-2 of FIG. 5), and converted blue-channel image data (e.g., converted blue-channel image data 504-3 of FIG. 5), and wherein the converted image data is represented by photonic quantum bits.

At operation 606, a photonic quantum computing system (e.g., photonic quantum computing system 156 of FIG. 5) receives the photon beam.

At operation 608, a beam splitter (e.g., beam splitter 168 of FIG. 5) splits the photon beam into a red-channel photon beam (e.g., red-channel photon beam 508-1 of FIG. 5), a green-channel photon beam (e.g., green-channel photon beam 508-2 of FIG. 5), and a blue-channel photon beam (e.g., blue-channel photon beam 508-3 of FIG. 5). The red-channel photon beam comprises the converted red-channel image data, the green-channel photon beam comprises the converted green-channel image data, and a blue-channel photon beam comprises the converted blue-channel image data.

At operation 610, a photonic quantum processor (e.g., photonic quantum processor 158 of FIG. 5) receives the red-channel photon beam, the green-channel photon beam, and the blue-channel photon beam.

At operation 612, the photonic quantum processor processes the converted image data by processing the red-channel photon beam, the green-channel photon beam, and the blue-channel photon beam, where each of the red-channel photon beam, the green-channel photon beam, and the blue-channel photon beam is processed by a respective neural network cluster (e.g., neural network clusters 160-1 through 160-m of FIG. 5) in parallel. In certain embodiments, operations 614 through 628 are performed in parallel with operations 630 through 644, and operations 646 through 660.

At operation 614, the photonic quantum processor converts the converted red-channel image data into first grayscale image data.

At operation 616, the photonic quantum processor applies one or more first filters (e.g., first filters 511 of FIG. 5) to the first grayscale image data to extract a plurality of first features (e.g., features 510-1 of FIG. 5).

At operation 618, the photonic quantum processor applies a first pooling process to the plurality of first features to eliminate orientation effects.

At operation 620, the photonic quantum processor applies one or more second filters (e.g., second filters 515 of FIG. 5) to the plurality of first features to refine the plurality of first features.

At operation 622, the photonic quantum processor applies a second pooling process to the plurality of first features to further eliminate orientation effects.

At operation 624, the photonic quantum processor compares the plurality of first features to a plurality of pre-trained features (e.g., pre-trained features 512 of FIG. 5) extracted from pre-training images (e.g., pre-training images 513 of FIG. 5).

At operation 626, in response to the plurality of first features matching respective pre-trained features, the photonic quantum processor identifies a plurality of identified first features (e.g., features 510-1 of FIG. 5).

At operation 628, the photonic quantum processor sends the plurality of identified first features to the converter system as a second red-channel photon beam (e.g., red-channel photon beam 514-1 of FIG. 5).

At operation 630, the photonic quantum processor converts the converted green-channel image data into second grayscale image data.

At operation 632, the photonic quantum processor applies the one or more first filters to the second grayscale image data to extract a plurality of second features (e.g., features 510-2 of FIG. 5).

At operation 634, the photonic quantum processor applies the first pooling process to the plurality of second features to eliminate orientation effects.

At operation 636, the photonic quantum processor applies the one or more second filters to the plurality of second features to refine the plurality of second features.

At operation 638, the photonic quantum processor applies the second pooling process to the plurality of second features to further eliminate orientation effects.

At operation 640, the photonic quantum processor compares the plurality of second features to the plurality of pre-trained features extracted from the pre-training images.

At operation 642, in response to the plurality of second features matching respective pre-trained features, the photonic quantum processor identifies a plurality of identified second features (e.g., features 510-2 of FIG. 5).

At operation 644, the photonic quantum processor sends the plurality of identified second features to the converter system as a second green-channel photon beam (e.g., green-channel photon beam 514-2 of FIG. 5).

At operation 646, the photonic quantum processor converts the converted blue-channel image data into third grayscale image data.

At operation 648, the photonic quantum processor applies the one or more first filters to the third grayscale image data to extract a plurality of third features (e.g., features 510-3 of FIG. 5).

At operation 650, the photonic quantum processor applies the first pooling process to the plurality of third features to eliminate orientation effects.

At operation 652, the photonic quantum processor applies the one or more second filters to the plurality of third features to refine the plurality of third features.

At operation 654, the photonic quantum processor applies the second pooling process to the plurality of third features to further eliminate orientation effects.

At operation 656, the photonic quantum processor compares the plurality of third features to the plurality of pre-trained features extracted from the pre-training images.

At operation 658, in response to the plurality of third features matching respective pre-trained features, the photonic quantum processor identifies a plurality of identified third features (e.g., features 510-3 of FIG. 5).

At operation 660, the photonic quantum processor sends the plurality of identified third features to the converter system as a second blue-channel photon beam (e.g., blue-channel photon beam 514-3 of FIG. 5).

At operation 662, the converter system receives the second red-channel photon beam, the second green-channel photon beam, and the second blue-channel photon beam.

At operation 664, the converter system converts the plurality of identified first features to the plurality of converted identified first features (e.g., features 516-1 of FIG. 5), where the plurality of converted identified first features are represented by classical binary bits.

At operation 666, the converter system converts the plurality of identified second features to the plurality of converted identified second features (e.g., features 516-2 of FIG. 5), where the plurality of converted identified second features are represented by classical binary bits.

At operation 668, the converter system converts the plurality of identified third features to the plurality of converted identified third features (e.g., features 516-3 of FIG. 5), where the plurality of converted identified third features are represented by classical binary bits.

At operation 670, a data extraction system (e.g., data extraction system 518 of FIG. 5) generate extracted data (e.g., extracted data 522 of FIG. 5) by combining the plurality of converted identified first features, the plurality of converted identified second features and the plurality of converted identified third features.

The method 600 provides one or more advantages. The method 600 is particularly integrated into practical applications of image processing using photonic quantum computing. By using a photonic quantum computing system, a computing time may be reduced, which may in turn lead to overall reduction of computing resource utilization. In particular, various computation tasks may be performed in parallel by the photonic quantum computing system, which may lead to about 1000 times increase in computing speed. Accordingly, embodiments described herein provide improvements to an underlying computing system.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
a converter system configured to:
  receive voice data, wherein the voice data is represented by classical binary bits; and
  convert the voice data to a first photon beam comprising converted voice data,
wherein the converted voice data is represented by photonic quantum bits;
a photonic quantum computing system communicatively coupled the converter system, the photonic quantum computing system comprising:
  a beam splitter configured to:
    receive the first photon beam; and
    split the first photon beam into a plurality of split photon beams; and
  a photonic quantum processor coupled to the beam splitter and implementing a quantum neural network, wherein the quantum neural network comprises a plurality of quantum neural network clusters, and wherein the photonic quantum processor is configured to:
    receive the plurality of split photon beams; and
    process the converted voice data by processing the plurality of split photon beams, wherein each of the plurality of split photon beams is processed by a respective neural network cluster in parallel, and wherein processing the converted voice data comprises:
      extracting a plurality of voice features from the converted voice data;
      creating word embeddings based on the plurality of voice features;
      determining a plurality of sentences based on the word embeddings;
      determining first correlations between each word and all other words of each sentence based on the word embeddings;
      identifying a context of each sentence based on the first correlations;
      determining second correlations between each word of each sentence and all words of a previous sentence based on the word embeddings;
      determining an intent of the plurality of sentences based on the first correlations and the second correlations; and
      sending the plurality of sentences and the intent as a second photon beam.

2. The apparatus of claim 1, wherein the voice features comprise a frequency, a pitch, an amplitude, a zero crossing rate, a root mean square energy, a mel spectrogram, a band energy ratio, and a spectral centroid.

3. The apparatus of claim 1, wherein creating the word embeddings comprises determining matrix representations of respective words.

4. The apparatus of claim 1, wherein determining the first correlations between each word and all other words of each sentence based on the word embeddings comprise calculating matrix product of a matrix representation of each word and matrix representations of all other words of each sentence.

5. The apparatus of claim 1, wherein determining the second correlations between each word of each sentence and all words of a previous sentence based on the word embeddings comprise calculating a matrix product of a matrix representation of each word of each sentence and matrix representations of all words of the previous sentence.

6. The apparatus of claim 1, wherein the converter system is further configured to:
receive the second photon beam;
convert the plurality of sentences to a plurality of converted sentences, wherein the plurality of converted sentences are represented by classical binary bits; and
convert the intent to a converted intent, wherein the converted intent is represented by classical binary bits.

7. The apparatus of claim 6, wherein the photonic quantum processor is further configured to:
send the plurality of converted sentences and the converted intent to an application system.

8. A method comprising:
receiving voice data, wherein the voice data is represented by classical binary bits;
converting the voice data to a first photon beam comprising converted voice data, wherein the converted voice data is represented by photonic quantum bits;
splitting the first photon beam into a plurality of split photon beams;
receiving the plurality of split photon beams by a quantum neural network, wherein the quantum neural network comprises a plurality of quantum neural network clusters; and
processing the converted voice data by processing the plurality of split photon beams, wherein each of the plurality of split photon beams is processed by a respective neural network cluster in parallel, and wherein processing the converted voice data comprises:
extracting a plurality of voice features from the converted voice data;
creating word embeddings based on the plurality of voice features;
determining a plurality of sentences based on the word embeddings;
determining first correlations between each word and all other words of each sentence based on the word embeddings;
identifying a context of each sentence based on the first correlations;
determining second correlations between each word of each sentence and all words of a previous sentence based on the word embeddings;
an intent of the plurality of sentences based on the first correlations and the second correlations; and
sending the plurality of sentences and the intent as a second photon beam.

9. The method of claim 8, wherein the voice features comprise a frequency, a pitch, an amplitude, a zero crossing rate, a root mean square energy, a mel spectrogram, a band energy ratio, and a spectral centroid.

10. The method of claim 8, wherein creating the word embeddings comprises determining matrix representations of respective words.

11. The method of claim 8, wherein determining the first correlations between each word and all other words of each sentence based on the word embeddings comprise calculating matrix product of a matrix representation of each word and matrix representations of all other words of each sentence.

12. The method of claim 8, wherein determining the second correlations between each word of each sentence and all words of a previous sentence based on the word embeddings comprise calculating a matrix product of a matrix representation of each word of each sentence and matrix representations of all words of the previous sentence.

13. The method of claim 8, further comprising:
receiving the second photon beam;
converting the plurality of sentences to a plurality of converted sentences, wherein the plurality of converted sentences are represented by classical binary bits; and
converting the intent to a converted intent, wherein the converted intent is represented by classical binary bits.

14. The method of claim 13, further comprising:
sending the plurality of converted sentences and the converted intent to an application system.

15. A non-transitory computer-readable medium storing instructions that, when executed by one or more processors, cause the one or more processors to:
receive voice data, wherein the voice data is represented by classical binary bits;
convert the voice data to a first photon beam comprising converted voice data, wherein the converted voice data is represented by photonic quantum bits;
split the first photon beam into a plurality of split photon beams;
receive the plurality of split photon beams by a quantum neural network, wherein the quantum neural network comprises a plurality of quantum neural network clusters; and
process the converted voice data by processing the plurality of split photon beams, wherein each of the plurality of split photon beams is processed by a respective neural network cluster in parallel, and wherein processing the converted voice data comprises:
extracting a plurality of voice features from the converted voice data;
creating word embeddings based on the plurality of voice features;
determining a plurality of sentences based on the word embeddings;
determining first correlations between each word and all other words of each sentence based on the word embeddings;
identifying a context of each sentence based on the first correlations;
determining second correlations between each word of each sentence and all words of a previous sentence based on the word embeddings;
an intent of the plurality of sentences based on the first correlations and the second correlations; and
sending the plurality of sentences and the intent as a second photon beam.

16. The non-transitory computer-readable medium of claim 15, wherein creating the word embeddings comprises determining matrix representations of respective words.

17. The non-transitory computer-readable medium of claim 15, wherein determining the first correlations between each word and all other words of each sentence based on the word embeddings comprise calculating matrix product of a matrix representation of each word and matrix representations of all other words of each sentence.

18. The non-transitory computer-readable medium of claim 15, wherein determining the second correlations between each word of each sentence and all words of a previous sentence based on the word embeddings comprise calculating a matrix product of a matrix representation of each word of each sentence and matrix representations of all words of the previous sentence.

19. The non-transitory computer-readable medium of claim 15, wherein the instructions, when executed by the one or more processors, further cause the one or more processors to:
  receive the second photon beam;
  convert the plurality of sentences to a plurality of converted sentences, wherein the plurality of converted sentences are represented by classical binary bits; and
  convert the intent to a converted intent, wherein the converted intent is represented by classical binary bits.

20. The non-transitory computer-readable medium of claim 15, wherein at least one of the one or more processors is a photonic quantum processor.

\* \* \* \* \*